(12) United States Patent
Hosoe et al.

(10) Patent No.: US 7,431,151 B2
(45) Date of Patent: Oct. 7, 2008

(54) HYDROGEN STORAGE TANK

(75) Inventors: Mitsuya Hosoe, Saitama (JP); Izuru Kanoya, Iruma-gun (JP); Ryogo Sakamoto, Wako (JP); Terumi Furuta, Tokorozawa (JP); Hajime Goto, Fujimi (JP)

(73) Assignee: Honda Motor Co., Ltd., Tokyo (JP)

( * ) Notice: Subject to any disclaimer, the term of this patent is extended or adjusted under 35 U.S.C. 154(b) by 409 days.

(21) Appl. No.: 11/226,029

(22) Filed: Sep. 14, 2005

(65) Prior Publication Data

US 2006/0054022 A1 Mar. 16, 2006

(30) Foreign Application Priority Data

Sep. 14, 2004 (JP) .............................. 2004-267104

(51) Int. Cl.
*F17C 11/00* (2006.01)
*B01J 20/22* (2006.01)

(52) U.S. Cl. ...................................... 206/0.7; 502/526
(58) Field of Classification Search .................. 96/108; 206/0.7; 502/526; 420/900; 423/248, 648.1
See application file for complete search history.

(56) References Cited

U.S. PATENT DOCUMENTS

| | | | |
|---|---|---|---|
| 6,214,492 B1 * | 4/2001 | Kono et al. | 429/218.2 |
| 6,309,446 B1 | 10/2001 | Nakanoya et al. | |
| 6,991,773 B2 * | 1/2006 | Jhi et al. | 423/648.1 |
| 2002/0088806 A1 | 7/2002 | Takaku et al. | |
| 2002/0117123 A1 * | 8/2002 | Hussain et al. | 123/3 |
| 2003/0004364 A1 | 1/2003 | Yaghi et al. | |
| 2003/0148165 A1 * | 8/2003 | Muller et al. | 429/34 |
| 2006/0252641 A1 * | 11/2006 | Yaghi et al. | 502/401 |

FOREIGN PATENT DOCUMENTS

| | | |
|---|---|---|
| CA | 2474615 A1 | 8/2003 |
| DE | 10111230 A1 | 9/2002 |
| EP | 0790253 A2 | 8/1997 |
| EP | 1384940 A2 | 1/2004 |
| JP | 2002-188794 | 7/2002 |
| JP | 2002-250593 | 9/2002 |
| WO | WO-02/088148 A1 | 11/2002 |
| WO | WO-03/064030 A1 | 8/2003 |

OTHER PUBLICATIONS

European Search Report Application No. 05255671.9-2425 dated Dec. 20, 2005.

* cited by examiner

*Primary Examiner*—Frank M Lawrence
(74) *Attorney, Agent, or Firm*—Lahive & Cockfield, LLP; Anthony A. Laurentano, Esq.

(57) ABSTRACT

A hydrogen storage tank comprises a hydrogen adsorbent accommodated in a pressure-resistant container. The hydrogen adsorbent is capable of adsorbing and retaining hydrogen gas of a volume exceeding an occupation volume occupied by the hydrogen adsorbent itself. As for the hydrogen adsorbent, the amount of endothermic heat, which is generated when the adsorbed hydrogen gas is released, is not more than 16 kJ per mol of hydrogen molecules. The hydrogen adsorbent is prevented from leaking outside of the pressure-resistant container by a filter.

6 Claims, 9 Drawing Sheets

FIG. 9

|  | CUMULATIVE FLOW RATE (L) UPON HYDROGEN RELEASE AT 20 °C |
|---|---|
| EXAMPLE 1 | 19.0 |
| COMPARATIVE EXAMPLE 1 | 13.5 |
| COMPARATIVE EXAMPLE 2 | 15.9 |

HYDROGEN STORAGE TANK

BACKGROUND OF THE INVENTION

1. Field of the Invention

The present invention relates to a hydrogen storage tank wherein a hydrogen adsorbent, which is capable of adsorbing and retaining hydrogen, is accommodated in a container.

2. Description of the Related Art

In recent years, concern over environmental protection is increasing. From this viewpoint, attention is directed to fuel cell vehicles which use a fuel cell as a running driving source. In addition to the fuel cell, the fuel cell vehicle carries a hydrogen storage tank which stores hydrogen gas to be supplied to the fuel cell.

An example of such a hydrogen storage tank is a high pressure hydrogen storage tank in which hydrogen gas is stored in a container in a state of being compressed at a high charging pressure. In the high pressure hydrogen storage tank, the larger the charging pressure is, the larger the storage amount of the hydrogen gas is. Accordingly, the amount of the hydrogen gas capable of being supplied to the fuel cell is increased due to the large charging pressure. Therefore, in the high pressure hydrogen storage tank, it is necessary to increase the charging pressure to be as high as possible. In order to meet this need, Japanese Laid-Open Patent Publication No. 2002-188794 suggests a high pressure hydrogen storage tank in which the charging pressure increases to about 25 MPa.

However, in the high pressure hydrogen storage tank, it is difficult to improve the charge amount by further compressing the hydrogen gas, because improvement in pressure resistance of the container has a certain limit, and hence the charging pressure also has a certain limit. If the charging pressure is increased, the energy required for the charging is also increased.

In view of the above, a hydrogen storing alloy tank which accommodates, in a container, a hydrogen storing alloy such as $LaNi_5$ alloy, $Mg_2Ni$ alloy, and Mg (see, for example, Japanese Laid-Open Patent Publication No. 2002-250593) has been drawing attention. The hydrogen storing alloy is capable of absorbing or occluding the hydrogen gas therein and releasing the occluded hydrogen gas therefrom. Therefore, the charging pressure can be set, for example, to about 1 Mpa, which is a value extremely lower than the pressure used for the high pressure hydrogen storage tank.

The reaction, which is caused when the hydrogen gas is occluded by the hydrogen storing alloy, is an exothermic reaction. Specifically, when the $LaNi_5$ alloy, the $Mg_2Ni$ alloy, and Mg are used, large amounts of heat, i.e., 30 kJ/mol $H_2$ (which means 30 kJ per mol of $H_2$, same applies hereinafter), 64 kJ/mol $H_2$, and 73 kJ/mol $H_2$ are generated respectively in order to occlude the hydrogen gas at 25° C. Accordingly, the temperature of the container to accommodate the hydrogen storing alloy is increased, and the occlusion of hydrogen effected by the hydrogen storing alloy is stopped. Therefore, a cooling mechanism is required in order to remove the heat.

On the other hand, the reaction, which is caused when the hydrogen gas is released from the hydrogen storing alloy, is an endothermic reaction. Therefore, for example, in the $LaNi_5$ alloy, it is necessary to supply an amount of heat of 30 kJ/mol $H_2$. In particular, in the fuel cell vehicle, it is necessary to quickly supply the hydrogen gas to the fuel cell in order to obtain the driving force required for sudden acceleration and slope climbing. In order to realize such performance, it is necessary to add a heat exchange mechanism and a heat transfer function as described in Japanese Laid-Open Patent Publication No. 2002-250593.

That is, when the hydrogen storing alloy tank is used, it is necessary to additionally provide, for example, a cooling mechanism and a heating mechanism. Therefore, the weight of the entire fuel cell system is extremely increased.

SUMMARY OF THE INVENTION

A general object of the present invention is to provide a hydrogen storage tank in which it is unnecessary to excessively increase charging pressure of hydrogen gas.

A principal object of the present invention is to provide a hydrogen storage tank in which it is unnecessary to additionally provide, for example, a cooling mechanism and a heating mechanism.

According to an embodiment of the present invention, there is provided a hydrogen storage tank comprising a container accommodating a hydrogen adsorbent therein for adsorbing hydrogen gas by the hydrogen adsorbent and accommodating the hydrogen gas in a space other than a space occupied by the hydrogen adsorbent in the container, wherein the hydrogen adsorbent is a substance which is capable of adsorbing the hydrogen gas of a volume exceeding an occupation volume of the hydrogen adsorbent and which has an amount of endothermic heat of not more than 16 kJ per mol of hydrogen molecules when the adsorbed hydrogen gas is released.

In this arrangement, the substance, which is capable of adsorbing the hydrogen gas of the volume exceeding the occupation volume of the substance itself, is used as the hydrogen adsorbent. Therefore, a large amount of hydrogen gas is stored in the container as compared with a case in which the hydrogen adsorbent is not accommodated. Further, the hydrogen adsorbent adsorbs and retains the hydrogen gas. Therefore, it is unnecessary to excessively increase the charging pressure when the hydrogen gas is stored.

The amount of endothermic heat, which is generated when the adsorbed hydrogen gas is released, is not more than 16 kJ per mol of hydrogen molecules. That is, the amount of exothermic heat is extremely small when the hydrogen gas is adsorbed, and the amount of endothermic heat is also extremely small when the hydrogen gas is released. Therefore, when the hydrogen gas is charged or released, then the heat is exchanged with respect to the surrounding atmosphere, and thus the adsorption to the hydrogen adsorbent or the release from the hydrogen adsorbent is advanced. Accordingly, it is not necessary to provide any additional equipment such as cooling or heating equipment. Therefore, it is possible to simplify and miniaturize the fuel cell system.

According to another embodiment of the present invention, there is provided a hydrogen storage tank comprising a container accommodating a hydrogen adsorbent therein for adsorbing hydrogen gas by the hydrogen adsorbent and accommodating the hydrogen gas in a space other than a space occupied by the hydrogen adsorbent in the container, wherein the hydrogen adsorbent is a substance which satisfies the following expression (1) and which has an amount of endothermic heat of not more than 16 kJ per mol of hydrogen molecules when the adsorbed hydrogen gas is released:

$$Y > 2 \times 10^{-4} \times P/(\rho^* \times z \times R \times T) \qquad (1)$$

wherein Y represents a ratio of adsorption in units of % by weight of the hydrogen gas with respect to a weight of the hydrogen adsorbent, P represents a hydrogen gas pressure in units of MPa obtained when charging of the hydrogen gas is completed, $\rho^*$ represents a true density in units of $g/cm^3$ of the hydrogen adsorbent, z represents a compressibility factor of the hydrogen gas, R represents a gas constant of 8.314 J/mol·K, and T represents an absolute temperature in the units of K.

The hydrogen gas, which has the volume exceeding the occupation volume of the hydrogen adsorbent itself, is also adsorbed and retained by the hydrogen adsorbent by setting the temperature and the charging pressure as described above upon the charging.

A preferred example of the hydrogen adsorbent may be exemplified by any one of complex, activated carbon, carbon nanotube, amorphous carbon, graphite, zeolite, and mesoporous silicate.

In particular, the complex as the hydrogen adsorbent is preferred since a metal-organic framework exhibits excellent ability to retain the hydrogen gas.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a table illustrating the cumulative flow rates in relation to the embodiment and Comparative Examples 1 and 2 while making comparison with each other.

DESCRIPTION OF THE PREFERRED EMBODIMENTS

The hydrogen storage tank according to the present invention will be explained in detail below with reference to the accompanying drawings as exemplified by a preferred embodiment.

Figure 1:
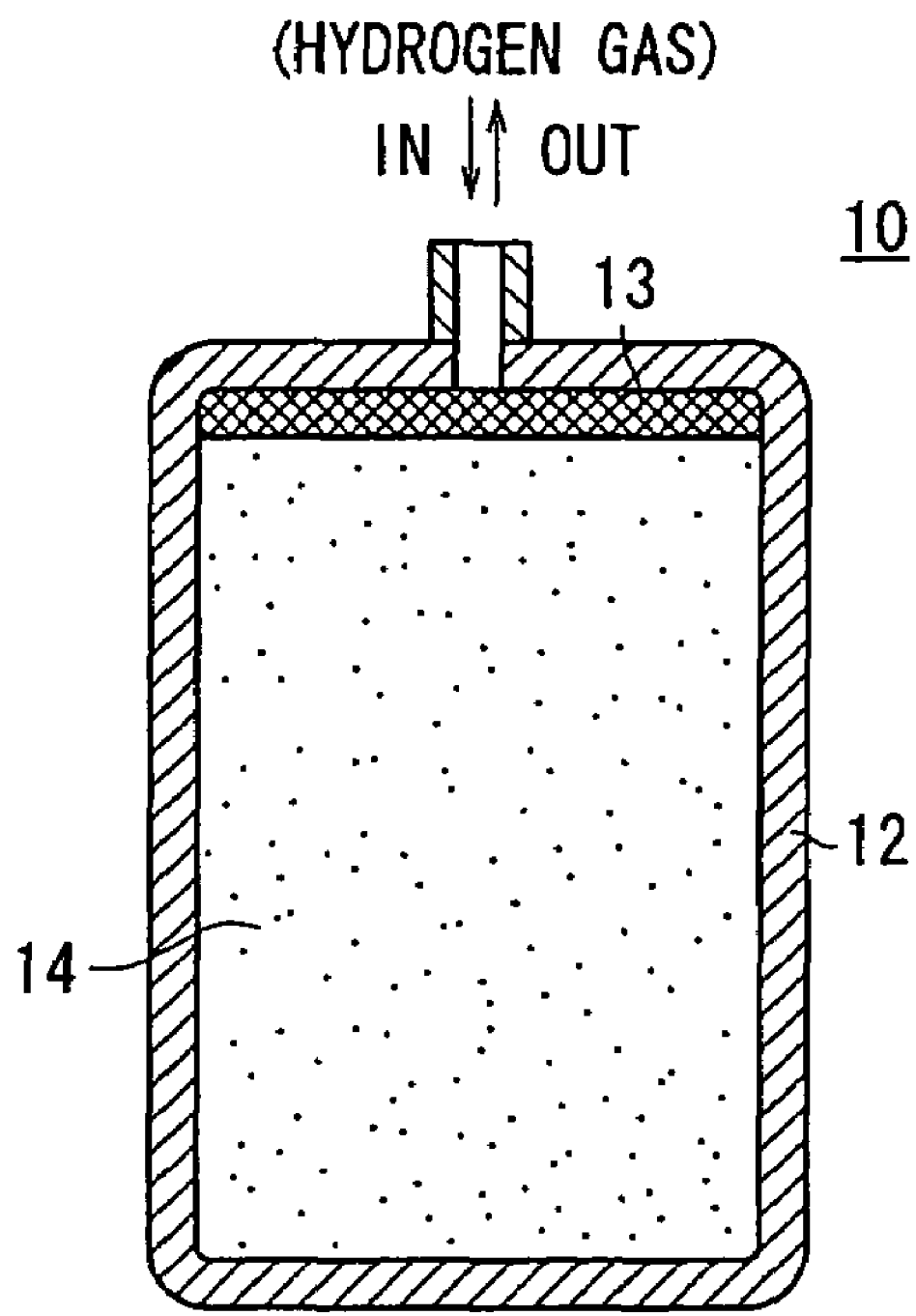
FIG. 1 is a schematic vertical sectional view illustrating a hydrogen storage tank according to an embodiment of the present invention.

FIG. 1 shows a schematic vertical sectional view illustrating an entire hydrogen storage tank 10 according to an embodiment of the present invention. In this arrangement, the hydrogen storage tank 10 has a pressure-resistant container 12 which is a cylindrical hollow member. A filter 13 is fixed to an upper portion of an inner wall of the pressure-resistant container 12. A powdery hydrogen adsorbent 14 is accommodated in the pressure-resistant container 12.

The meshes of the filter 13 are designed to be smaller than the particle size of the hydrogen adsorbent 14. Accordingly, the hydrogen adsorbent 14 is prevented from leaking outside of the pressure-resistant container 12 through the filter 13.

In this arrangement, it is necessary for the hydrogen adsorbent 14 to physically or chemically adsorb the hydrogen gas of the volume which exceeds the occupation volume determined by dividing the weight of the hydrogen adsorbent 14 by the true density. The hydrogen adsorbent 14 occupies only the amount of the occupation volume defined as described above in the pressure-resistant container 12. Therefore, by allowing the volume of the adsorbed hydrogen gas to be larger than the occupation volume of the hydrogen adsorbent 14 itself, the amount of the hydrogen gas capable of being charged to the pressure-resistant container 12 can be increased as compared with the amount obtained when the hydrogen adsorbent 14 is not accommodated.

The substances selected as preferred examples of the hydrogen adsorbent 14 as described above include such substances that the hydrogen gas, which has the volume exceeding the occupation volume determined by dividing the weight of the hydrogen adsorbent 14 by the true density, can be physically or chemically adsorbed and retained, and the amount of exothermic heat, which is generated upon the adsorption, is not more than 16 kJ/mol $H_2$. When the substance, with which the amount of exothermic heat generated upon the adsorption is not more than 16 kJ/mol $H_2$, is selected, the increase in the temperature of the pressure-resistant container 12 is suppressed during the adsorption. On the other hand, since the amount of heat, which is required when the hydrogen gas is released, is not more than 16 kJ/mol $H_2$, the hydrogen gas can be released even at a low temperature of, for example, −30° C.

Alternatively, the substance, with which it is difficult to adsorb and retain the hydrogen gas of the volume exceeding the occupation volume of the substance itself at ordinary temperature and ordinary pressure, may be used as the hydrogen adsorbent 14. In this case, the hydrogen gas of the volume exceeding the occupation volume of the substance itself may be adsorbed and retained by adjusting the temperature and the pressure.

In the above case, the temperature and the pressure are set as follows. That is, when the occupation volume of the hydrogen adsorbent 14 is designated as Va ($m^3$), the weight as Wa (g), and the true density as $\rho^* \times 10^6$ (g/$m^3$), then the following expression (2) is established among Va, Wa, $\rho^* \times 10^6$.

$$Va = Wa/(\rho^* \times 10^6) \quad (2)$$

The following expression (3) is obtained by modifying the expression (2).

$$Wa = Va \times \rho^* \times 10^6 \quad (3)$$

When the adsorption amount of the hydrogen gas adsorbed by the hydrogen adsorbent 14 is designated as Hw (g), and the ratio of the hydrogen gas with respect to Wa (weight of the hydrogen adsorbent 14) is designated as Y (% by weight), then Hw is determined in accordance with the following expression (4).

$$Hw = Wa \times (Y/100) \quad (4)$$

When the expression (3) is assigned to the expression (4), the following expression (5) is obtained.

$$Hw = Va \times \rho^* \times 10^4 \times Y \quad (5)$$

Since hydrogen molecules per mol weigh 2 g, the number of moles Na (mol) of the hydrogen gas of Hw (g) is Hw/2. According to this value and the expression (5), the following expression (6) is obtained.

$$Na = Va \times \rho^* \times 5 \times 10^3 \times Y \qquad (6)$$

The hydrogen gas is adsorbed to pores and surfaces of the respective powder particles of the hydrogen adsorbent 14. When the volume except for the volume occupied by the hydrogen adsorbent is designated as Vg (m$^3$), and the number of moles of the hydrogen gas having this volume is designated as Ng, then the following expression (7) is established.

$$P \times Vg = Ng \times z \times R \times T \qquad (7)$$

In the expression (7), P and T represent the charging pressure (MPa) and the temperature (K) respectively obtained when the charging of the hydrogen gas is completed into the pressure-resistant container 12, z represents the compressibility factor as described later on, and R represents the gas constant (8.314 J/mol·K).

When the internal volume of the pressure-resistant container 12 is designated as V (m$^3$), the relationship of Vg=V–Va is established among V, Vg, and Va. Therefore, when the expression (7) is modified, and this relationship is assigned to the expression (7), then the following expression (8) is obtained.

$$Ng = P \times (V-Va)/(z \times R \times T) \qquad (8)$$

On the other hand, the number of moles N0 of the hydrogen gas charged at the charging pressure P (MPa) at T (K) to the pressure-resistant container 12 accommodating no hydrogen adsorbent 14 therein is determined in accordance with the expression (9).

$$N0 = P \times V/(z \times R \times T) \qquad (9)$$

Assuming that N1 (mol) represents the number of moles of the hydrogen gas which occupies the volume corresponding to the occupation volume (Va) of the hydrogen adsorbent 14, N1=N0–Ng is established, and hence the expression (10) is obtained from this relational expression and the expressions (8) and (9).

$$N1 = [PV/zRT] - [P(V-Va)/(zRT)] \qquad (10)$$
$$= PVa/zRt$$

Therefore, when the following relational expression (11) is satisfied, the volume of the hydrogen gas adsorbed by the hydrogen adsorbent 14 is larger than the occupation volume of the hydrogen adsorbent 14.

$$Va \times \rho^* \times 5 \times 10^3 \times Y > PVa/zRT \qquad (11)$$

The direction of the sign of inequality is not changed even when both sides of the expression (11) are divided by Va, because Va is positive. That is, the following expression (12) is established.

$$\rho^* \times 5 \times 10^3 \times Y > P/zRT \qquad (12)$$

When the expression (12) is further modified, the expression (1) described above is obtained.

$$Y > P/(\rho^* \times 5 \times 10^3 \times zRT) = 2 \times 10^{-4} \times (P/\rho^* ZRT) \qquad (1)$$

As described above, z is the compressibility factor, which is the function of the pressure and the temperature. In the case of the hydrogen gas, z is approximated by the following expression (13).

$$z = 1 + P \times (A + BT^{-1} + CT^{-2} + DT^{-3} + ET^{-4}) \qquad (13)$$

A, B, C, D, and E are the virial coefficients, and they are the following constants respectively in the case of the hydrogen gas.

$$A = 4.93482 \times 10^{-5}$$

$$B = 2.04036 \times 10^{-2}$$

$$C = 8.15334 \times 10$$

$$D = -6.5561 \times 10^4$$

$$E = 4.56516 \times 10^6$$

As described above, z is the function of the charging pressure P and the temperature T, and $\rho^*$ is the known number inherent in the selected hydrogen adsorbent 14. Therefore, when $\rho^*$, P, and T are set to satisfy the expression (1), the hydrogen gas, which is of the volume exceeding the occupation volume of the hydrogen adsorbent 14, is adsorbed and retained.

Figure 2:
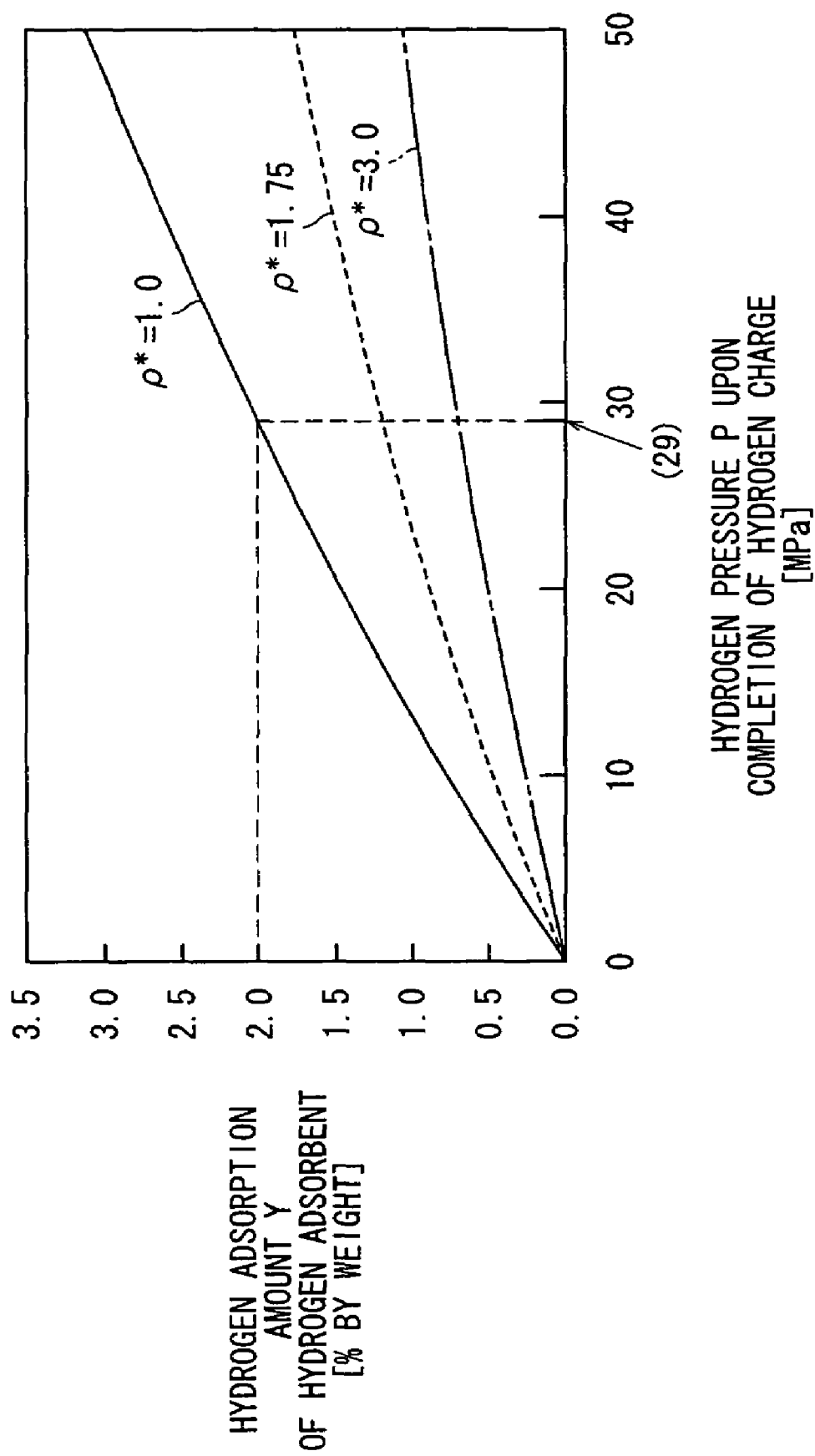
FIG. 2 is a graph illustrating the relationship between the charging pressure P and the hydrogen adsorption ratio Y of the hydrogen adsorbent.

For example, when the hydrogen adsorbents 14, which have $\rho^*$ of 1 g/cm$^3$, 1.75 g/cm$^3$, and 3 g/cm$^3$ respectively, are charged at a temperature of 300 K, as shown in FIG. 2, the line representing $Y = 2 \times 10^{-4} \times P/(\rho^* zRT)$ is drawn in the graph in which the horizontal axis indicates the charging pressure P and the vertical axis indicates the adsorption ratio Y of the hydrogen gas. In this graph, the portion above the line satisfies the expression (1). That is, for example, when the hydrogen adsorbent 14 having $\rho^*$ of 1.0 g/cm$^3$ is accommodated in a hydrogen high pressure tank specified for a charging pressure of 29 MPa, a substance in which the adsorption ratio of the hydrogen gas is not less than 2.0% by weight should be selected as the hydrogen adsorbent 14. When the hydrogen adsorbent 14 having $\rho^*$ of 3.0 g/cm$^3$ is accommodated in a hydrogen high pressure tank specified for a charging pressure of 20 MPa, a substance in which the adsorption ratio of the hydrogen gas is not less than 0.5% by weight should be selected as the hydrogen adsorbent 14.

Also in this case, the substance, in which the amount of endothermic heat is not more than 16 kJ per mol of hydrogen molecules, is selected as the hydrogen adsorbent 14. The endothermic heat is generated when the adsorbed hydrogen gas is released.

The hydrogen adsorbent 14 is not specifically limited provided that it has the physical property as described above. However, those exemplified as preferred examples include, for example, complex, activated carbon, carbon nanotube, amorphous carbon, graphite, zeolite, and mesoporous silicate.

In particular, it is preferable to use the complex, especially those having the metal-organic framework in which the organic molecule or the organic ion forms coordinate bond with the metal atom or the metal ion such that the organic molecule or the organic ion surrounds the metal atom or the metal ion. The metal-organic framework maintains the porous framework even when the guest molecule is absent. In other words, the framework is stable, and it is possible to adsorb the hydrogen molecules in the framework.

Specified examples of the metal-organic framework include, for example, [M$_2$(4,4'-bipyridine)$_3$(NO$_3$)$_4$] provided that M represents any one of Co, Ni, and Zn; [M$_2$(1,4-benzenedicarboxylate anion)$_2$] provided that M represents any one of Cu and Zn; and [Fe$_2$(trans-4,4'-azopyridine)$_4$(NCS)$_4$].

Alternatively, as described in U.S. Patent Application Publication No. 2003/0004364, it is also preferable to use a metal-organic framework in which the general formula is represented by $M_4O$(aromatic dicarboxylate anion)$_3$. Preferred examples of M include Zn and transition metals. The aromatic dicarboxylate anion may be substituted with an aromatic dicarboxylate anion derivative.

In this case, preferred examples of the aromatic dicarboxylate anion or the derivative thereof include, for example, 1,4-benzenedicarboxylate anion; 2-bromo-1,4-benzenedicarboxylate anion; 2-amino-1,4-benzenedicarboxylate anion; 2,5-propyl-1,4-benzenedicarboxylate anion; 2,5-pentyl-1,4-benzenedicarboxylate anion; cyclobutene-1,4-benzenedicarboxylate anion; 1,4-naphthalenedicarboxylate anion; 2,6-naphthalenedicarboxylate anion; 4,4'-biphenyldicarboxylate anion; 4,5,9,10-tetrahydropyrene-2,7-dicarboxylate anion; pyrene-2,7-dicarboxylate anion; and 4,4"-terphenyldicarboxylate anion. The respective structural formulas thereof are as follows.

[scheme 1]

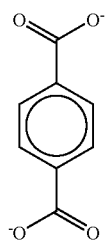

[scheme 2]

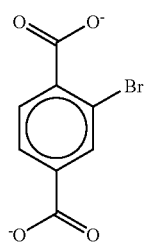

[scheme 3]

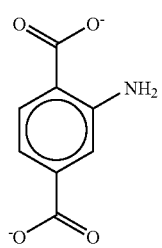

[scheme 4]

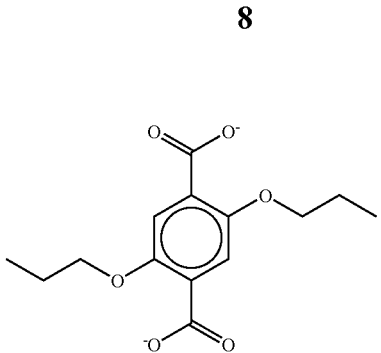

[scheme 5]

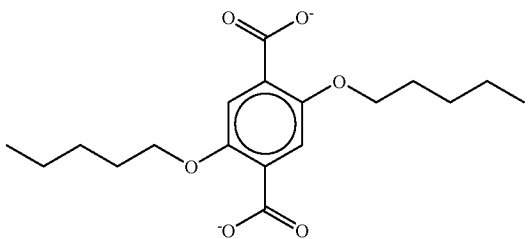

[scheme 6]

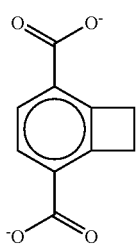

[scheme 7]

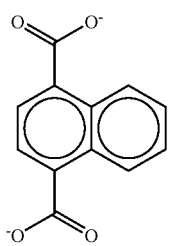

[scheme 8]

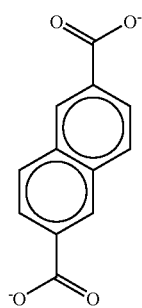

[scheme 9]

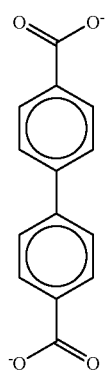

[scheme 10]

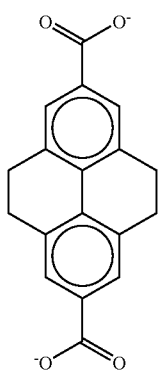

[scheme 11]

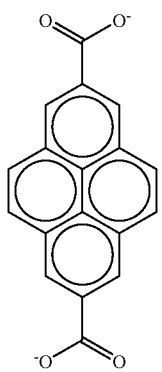

[scheme 12]

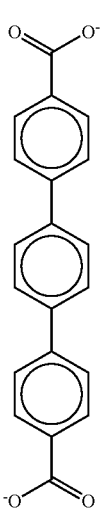

By accommodating the hydrogen adsorbent 14 as described above and setting the charging pressure and the temperature, a large amount of the hydrogen gas is stored as compared with a case in which the hydrogen adsorbent is not accommodated.

The hydrogen adsorbent 14 is such a substance that the amount of exothermic heat generated when the hydrogen gas is adsorbed and the amount of endothermic heat generated when the adsorbed hydrogen gas is released are not more than 16 kJ per mol of hydrogen molecules. Therefore, the increase in temperature is relatively small when the hydrogen gas is adsorbed, and the decrease in temperature is also relatively small when the hydrogen gas is released. Therefore, it is unnecessary to provide a heating mechanism for heating the hydrogen storage tank 10 and a cooling mechanism for cooling the hydrogen storage tank 10. In other words, the number of constitutive parts of the fuel cell system is decreased as compared with the conventional technique. Consequently, the fuel cell system is simplified and miniaturized.

It is a matter of course that a valve is installed at the opening when the hydrogen storage tank 10 is practically used.

EXAMPLE 1

At first, $Zn_4O$(2,6-naphthalenedicarboxylate anion)$_3$ as a crystalline member having the metal-organic framework was synthesized in accordance with the description in U.S. Patent Application Publication No. 2003/0004364. That is, 1.2 g of 2,6-naphthalenedicarboxylic acid and 11 g of $Zn(NO_3)_2 \cdot 4H_2O$ were firstly dissolved in 1,000 ml of diethylformaldehyde (DEF) in a tightly closed vessel. The solution was heated at 95° C. for 20 hours in the tightly closed vessel to obtain a reaction product.

The reaction product was separated by filtration, followed by being washed with DEF to obtain $Zn_4O$(2,6-naphthalenedicarboxylate anion)$_3 \cdot (DEF)_6$.

This substance was immersed in chloroform at room temperature for 24 hours, and thus DEF was substituted with $CHCl_3$. After that, $CH_3Cl$ was removed by vacuum evacuation to obtain $Zn_4O$(2,6-naphthalenedicarboxylate anion)$_3$.

The operation as described above was repeated to finally obtain 60 g of $Zn_4O$(2,6-naphthalenedicarboxylate anion)$_3$.

With regard to the obtained $Zn_4O$(2,6-naphthalenedicarboxylate anion)$_3$, the amount of exothermic heat generated when 1 mol of hydrogen gas was adsorbed and the amount of endothermic heat generated when 1 mol of hydrogen gas was released was measured based on the high pressure hydrogen DSC method. As a result, the amount of exothermic heat and the amount of endothermic heat were 8 kJ/mol $H_2$.

The hydrogen adsorption ratio was determined based on the Sieverts' method. On the other hand, the true density was measured by using an He auto-pycnometer. As a result, the adsorption ratio was 1.2% by weight (at 15 MPa), and the true density was 1.75 g/cm$^3$. Further, the specific surface area was determined by the BET method from the absorption isotherm of nitrogen. As a result, the specific surface area was 1,000 m$^2$/g.

50 g of $Zn_4O$(2,6-naphthalenedicarboxylate anion)$_3$ having the physical properties as described above was accommodated in a pressure-resistant container 12 made of SUS 304 having an internal volume of 100 cm$^3$ and a resistant pressure of 20 MPa together with a filter 13 in an atmospheric atmosphere in which first to third thermocouples indicated 20° C. to construct a hydrogen storage tank 10 as shown in FIG. 1.

Figure 3:
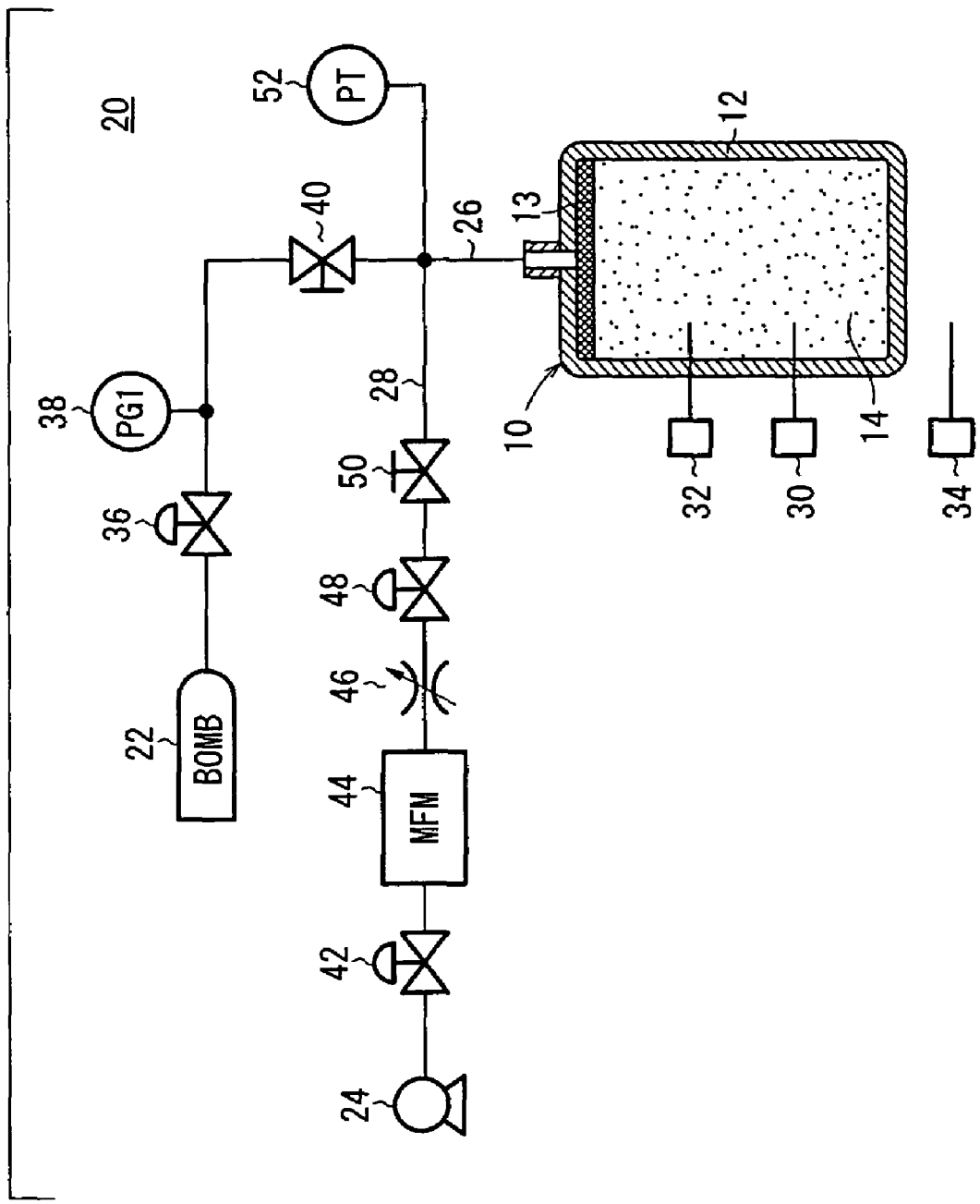
FIG. 3 is a schematic arrangement of a measuring system for charging and releasing the hydrogen gas with respect to the hydrogen storage tank shown in FIG. 1.

Subsequently, as shown in FIG. 3, a hydrogen gas release amount-measuring system (hereinafter simply referred to as "measuring system") 20, which includes the hydrogen storage tank 10, was constructed. The measuring system 20 is incorporated with the hydrogen storage tank 10 as well as a hydrogen bomb 22 which supplies the hydrogen gas to the hydrogen storage tank 10, and a vacuum pump 24 which evacuates the measuring system 20. The hydrogen storage tank 10 and the hydrogen bomb 22 are bridged with a first piping 26. The vacuum pump 24 is connected to a second piping 28 which is branched from the first piping 26.

The first thermocouple 30 and the second thermocouple 32 are installed to a lower portion and an upper portion of the hydrogen storage tank 10 respectively. In FIG. 3, reference numeral 34 indicates the third thermocouple which measures the temperature of the atmospheric air.

The first piping 26, with which the hydrogen bomb 22 and the hydrogen storage tank 10 are bridged, is equipped with a regulator 36, a pressure gauge 38, and a manual valve 40 in this order from the side of the hydrogen bomb 22. The second piping 28, which is branched from the first piping 26, is equipped with an automatic valve 42, a mass flow meter 44, a needle valve 46, a regulator 48, and a manual valve 50 in this order from the side of the vacuum pump 24. A pressure gauge 52 is installed at the connecting portion between the first piping 26 and the second piping 28.

The hydrogen gas, which is supplied from the hydrogen bomb 22, is stored in the hydrogen storage tank 10, and then the hydrogen gas is released by using the measuring system 20. Accordingly, the hydrogen gas storage amount of the hydrogen storage tank 10 is measured.

The interior of the measuring system 20 is firstly evacuated before storing the hydrogen gas. That is, the vacuum pump 24 is energized, and then the manual valves 40, 50 are opened. Subsequently, the automatic valve 42 is opened, and the interiors of the first piping 26 and the second piping 28 are evacuated in vacuum. When the pressure gauges 38, 52 indicate 10$^{-3}$ Torr, then the manual valves 40, 50 and the automatic valve 42 are closed, and the vacuum evacuation is stopped.

Subsequently, the regulator 36 is set to the charging pressure, and the manual valve 40 is opened. Accordingly, the hydrogen gas is supplied from the hydrogen bomb 22 to the hydrogen storage tank 10. In this procedure, the hydrogen gas, which had a charging pressure of 15 MPa, was promptly stored in the hydrogen storage tank 10. This state was retained for 1 hour.

Figure 4:
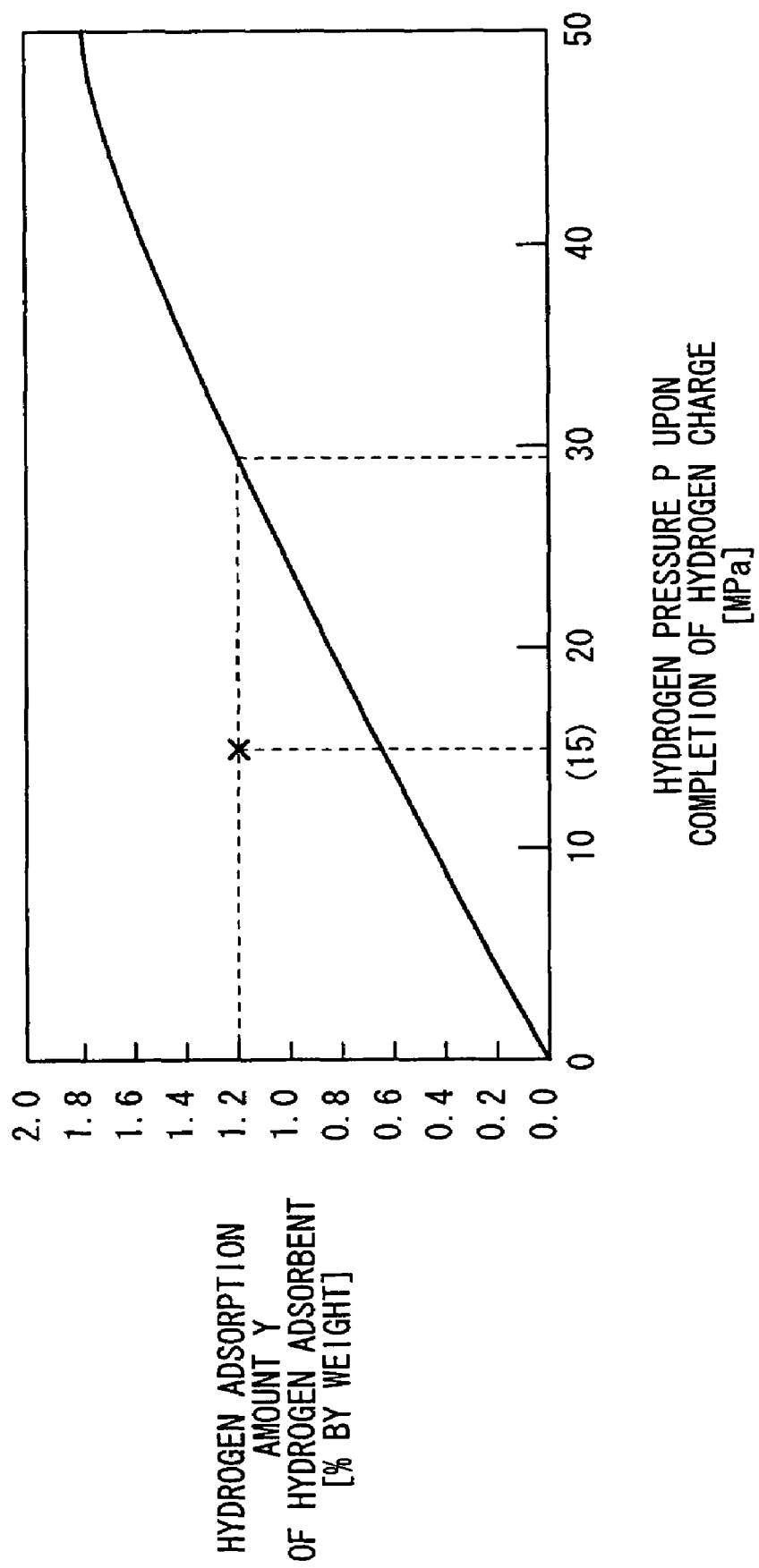
FIG. 4 is a graph illustrating the relationship between the charging pressure P and the hydrogen adsorption ratio Y of the hydrogen adsorbent.

In this embodiment, the preset pressure of the regulator 36, i.e., the charging pressure was set to 15 MPa, and the hydrogen charging temperature was set to 20° C. (293 K). As described above, the hydrogen adsorption ratio of the hydrogen adsorbent 14 at 15 MPa is 1.2% by weight, and the true density $\rho^*$ is 1.75 g/cm$^3$. Therefore, with reference to FIG. 4, the hydrogen adsorbent 14 is a material which satisfies the expression (1).

In this charging operation, it was recognized that the temperature was increased by about 15° C. to arrive at about 35° C. by the first thermocouple 30 and the second thermocouple 32. However, the temperature was decreased to the original temperature of about 20° C. in about 3 minutes after the completion of the charging operation.

Subsequently, the vacuum pump 24 was energized, and the automatic valve 42 was opened. After that, the manual valve 50 was opened to release the hydrogen gas contained in the hydrogen storage tank 10. The released hydrogen gas was introduced into the mass flow meter 44 while reducing the pressure to 0.1 MPa by using the regulator 48 and the needle valve 46. The flow rate and the cumulative flow rate were measured. The point of time, at which the increase in the cumulative flow rate was not observed, was regarded to correspond to the completion of the hydrogen gas release. The manual valve 50 and the automatic valve 42 were closed, and the vacuum pump 24 was stopped. The cumulative flow rate and the temperature change were indicated in graphs in FIGS. 5 and 6 respectively. According to FIG. 5, the cumulative flow rate (release amount) was 19.0 liters.

Figure 6:
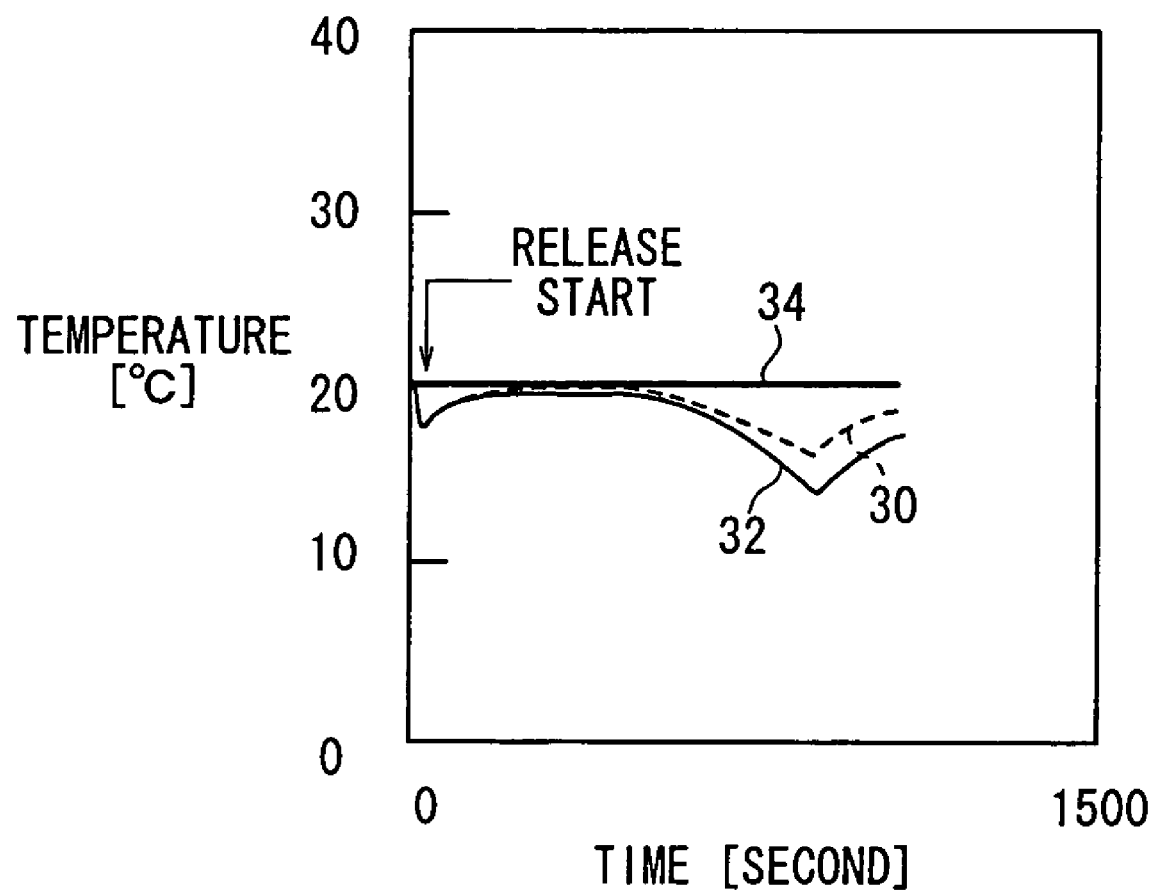
FIG. 6 is a graph illustrating the temperature change of a pressure-resistant container, which occurs when the hydrogen gas is released from the hydrogen storage tank of the embodiment.

Reference numerals affixed to the respective temperature curves in FIG. 6 correspond to reference numerals of the respective thermocouples used to measure the temperatures. That is, the temperature curves of 30, 32, 34 represent the temperature of the lower portion of the hydrogen storage tank 10 measured by the first thermocouple 30, the temperature of the upper portion of the hydrogen storage tank 10 measured by the second thermocouple 32, and the temperature of the atmospheric air measured by the third thermocouple 34 respectively.

As clearly understood from FIG. 6, the temperatures, which were measured by the first thermocouple 30 and the second thermocouple 32, were decreased immediately after the release of the hydrogen gas started. The decrease in temperature was caused by the adiabatic expansion which occurs in accordance with the release of the hydrogen gas.

The temperature drop is also observed during the release of the hydrogen gas, for the following reason. That is, the release of the hydrogen gas from the hydrogen adsorbent 14 is the endothermic reaction, and the heat is deprived from the surrounding atmosphere of the hydrogen storage tank 10.

Figure 5:
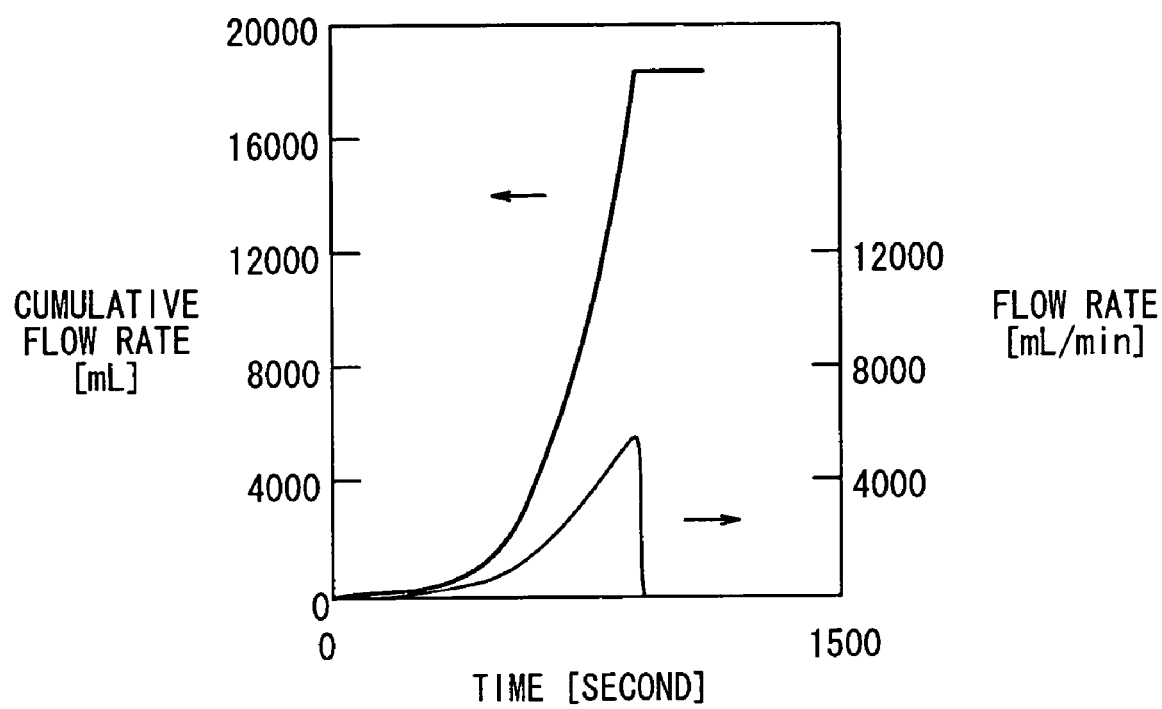
FIG. 5 is a graph illustrating the relationship between the time and the cumulative flow rate obtained when the hydrogen gas is released from the hydrogen storage tank of the embodiment.

However, according to both of FIGS. 5 and 6, it is acknowledged that the hydrogen gas is released even after the temperature drop. That is, according to the embodiment of the present invention, the hydrogen gas is continuously released even at room temperature without additionally providing any heating mechanism in the vicinity of the hydrogen storage tank 10.

COMPARATIVE EXAMPLE 1

The hydrogen gas was charged to the pressure-resistant container 12 at a charging pressure of 15 MPa at a temperature of 20° C. in the same manner as in Example 1 except that the hydrogen adsorbent 14 was not accommodated in the pressure-resistant container 12. After that, the hydrogen gas was released. In this case, the cumulative flow rate was 13.5 liters, which was smaller than that obtained in Example 1.

COMPARATIVE EXAMPLE 2

An La powder and an Ni powder were weighed so that the composition satisfied $LaNi_5$ in atomic % to obtain a mixed powder of 100 g as a whole. The mixed powder was melted by the high frequency wave to prepare an ingot. Heat treatment was applied to the ingot at 1,050° C. for 48 hours, followed by being pulverized into 100 mesh under to obtain $LaNi_5$ as a hydrogen storing alloy.

As for this $LaNi_5$, the amount of exothermic heat upon the adsorption of 1 mol of hydrogen gas by the high pressure hydrogen DSC method (amount of endothermic heat upon the release of 1 mol of hydrogen gas) was 30.1 kJ/mol $H_2$, the hydrogen adsorption ratio based on the Sieverts' method was 1.2% by weight (at 15 MPa), and the true density based on the Archimedes' method was 7.5 $g/cm^3$.

50 g of this $LaNi_5$ was accommodated in the pressure-resistant container 12 having the same size at the same temperature as that used in Example 1 to construct a hydrogen storing alloy tank. After that, the hydrogen gas was charged to the hydrogen storing alloy tank at a charging pressure of 15 MPa. During this process, the temperature of the hydrogen storage tank 10 measured by the first thermocouple 30 and the second thermocouple 32 was increased by about 100° C., and the temperature arrived at about 120° C. Therefore, the cooling was performed with a small type fan. As a result, a period of time of about 1 hour was required to effect the cooling to 20° C.

Figure 7:
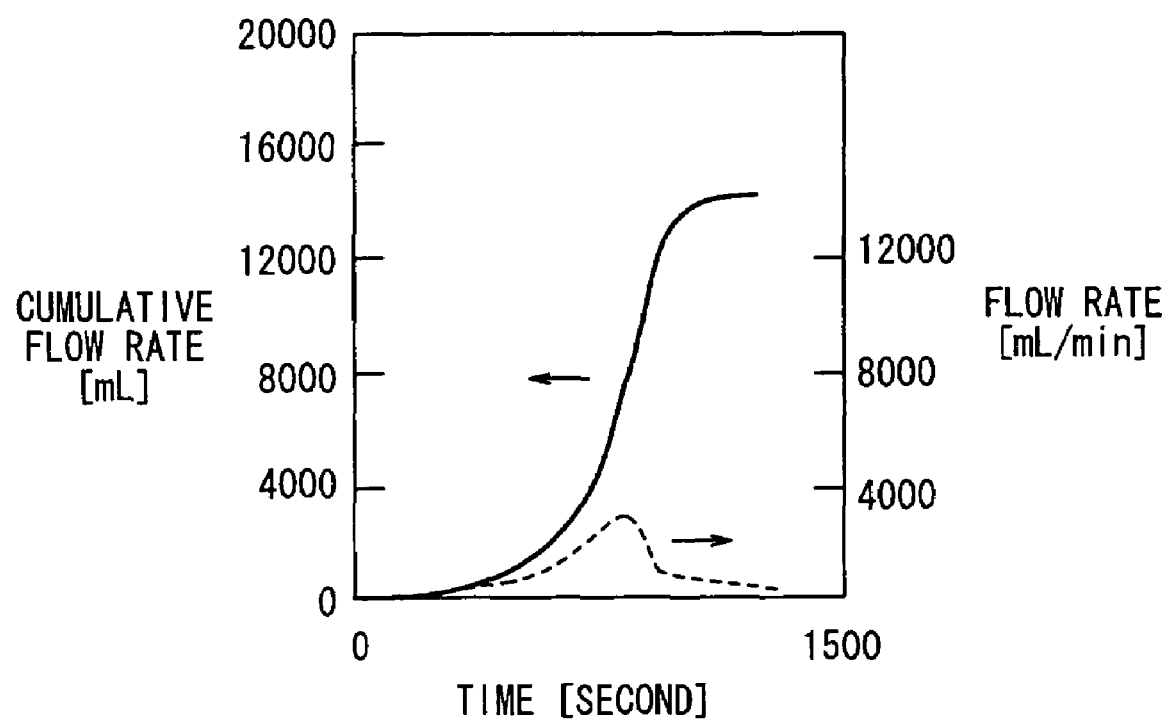
FIG. 7 is a graph illustrating the relationship between the time and the cumulative flow rate obtained when the hydrogen gas is released from a hydrogen storing alloy tank of Comparative Example 2.
Figure 8:
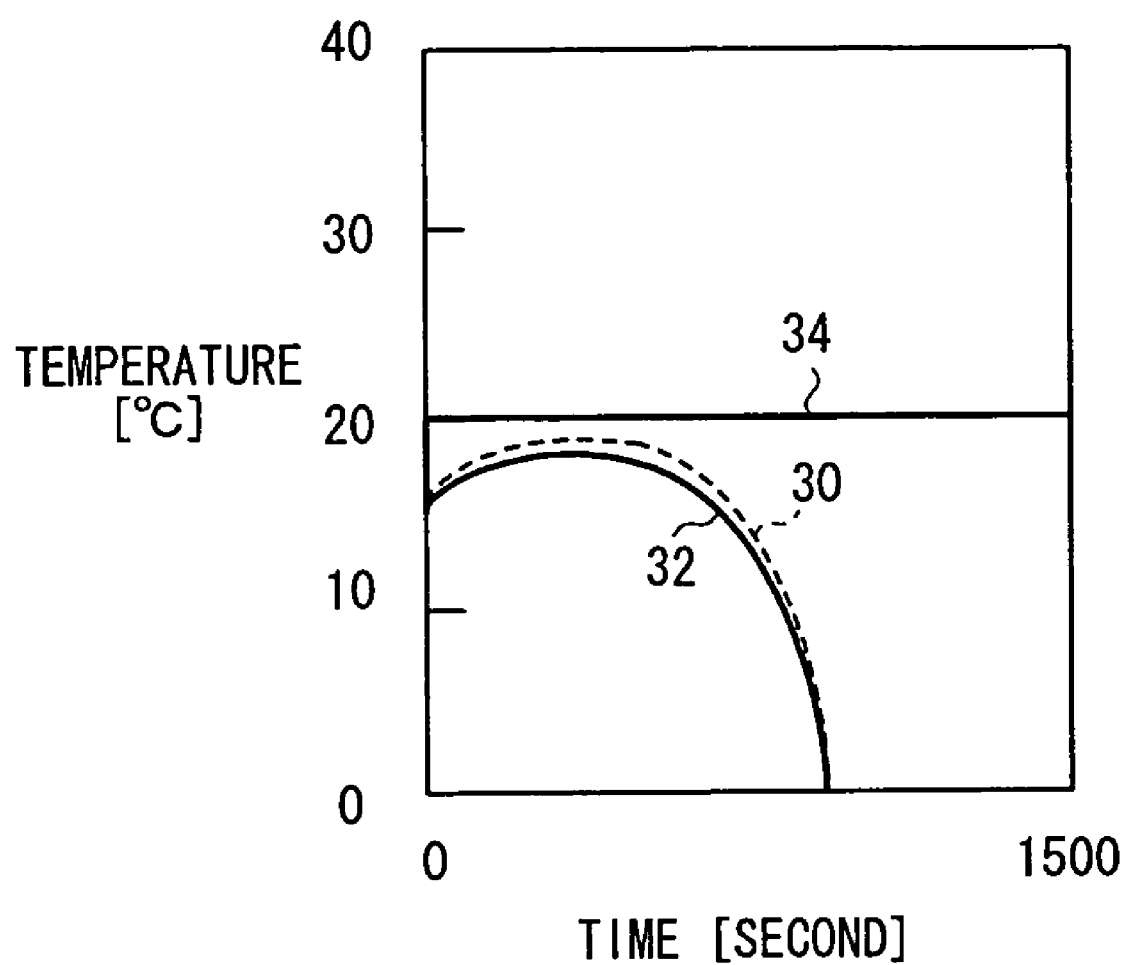
FIG. 8 is a graph illustrating the temperature change of a pressure-resistant container, which occurs when the hydrogen gas is released from the hydrogen storing alloy tank of Comparative Example 2.

Subsequently, the hydrogen gas was released from the hydrogen storing alloy tank in the same manner as in Example 1. FIGS. 7 and 8 show the cumulative flow rate and the temperature change in this operation respectively. In this case, as shown in FIG. 7, the cumulative flow rate was 15.9 liters.

On the other hand, as shown in FIG. 8, the temperature of the hydrogen storage tank 10 was lowered by the adiabatic expansion accompanied by the release of the hydrogen gas immediately after the release of the hydrogen gas. The temperature did not increase significantly thereafter, but suddenly decreased in accordance with the further release of the hydrogen gas. As a result of this temperature drop, the release of the hydrogen gas from the hydrogen storing alloy was stopped. Reference numerals shown in FIG. 8 correspond to reference numerals of the thermocouples used to measure the temperatures in the same manner as in FIG. 6.

The cumulative flow rates obtained in Example 1 and Comparative Examples 1 and 2 as described above are shown in FIG. 9. According to FIG. 9, the hydrogen storage tank 10 according to the embodiment of the present invention is capable of releasing the largest amount of the hydrogen gas without requiring any additional equipment.

Although certain preferred embodiments of the present invention have been shown and described in detail, it should be understood that various changes and modifications may be made therein without departing from the scope of the appended claims.

What is claimed is:

1. A hydrogen storage tank comprising a container accommodating a hydrogen adsorbent therein, wherein said hydrogen adsorbent adsorbs hydrogen gas and accommodates said hydrogen gas in a space other than a space occupied by said hydrogen adsorbent in said container, wherein
   said hydrogen adsorbent is any one of $[M_2(4,4'$-bipyridine$)_3$ $(NO_3)_4]$ provided that M represents any one of Co, Ni, and Zn; $[M_2(1,4$-benzenedicarboxylate anion$)_2]$ provided that M represents any one of Cu and Zn; and $[Fe_2(trans$-$4,4'$-azopyridine$)_4(NCS)_4]$; and
   said hydrogen adsorbent is capable of adsorbing said hydrogen gas of a volume exceeding an occupation volume of said hydrogen adsorbent and which has an amount of endothermic heat of not more than 16 kJ per mol of hydrogen molecules when said adsorbed hydrogen gas is released.

2. A hydrogen storage tank comprising a container accommodating a hydrogen adsorbent therein, wherein said hydrogen adsorbent adsorbs hydrogen gas and accommodates said hydrogen gas in a space other than a space occupied by said hydrogen adsorbent in said container, wherein
   said hydrogen adsorbent is $M_4O$(aromatic dicarboxylate anion$)_3$ or $M_4O$(aromatic dicarboxylate anion derivative$)_3$, wherein M represents Zn or a transition metal, and
   said hydrogen adsorbent is capable of adsorbing said hydrogen gas of a volume exceeding an occupation volume of said hydrogen adsorbent and which has an amount of endothermic heat of not more than 16 kJ per mol of hydrogen molecules when said adsorbed hydrogen gas is released.

3. The hydrogen storage tank according to claim 2, wherein said aromatic dicarboxylate anion or said derivative thereof is 1,4-benzenedicarboxylate anion; 2-bromo-1,4-benzenedicarboxlate anion; 2-amino-1,4-benzenedicarboxylate anion; 2,5-propyl-1,4-benzenedicarboxylate anion; 2,5-pentyl-1,4-benzenedicarboxylate anion; cyclobutene-1,4-benzenedicarboxylate anion; 1,4-naphthalenedicarboxylate anion; 2,6-naplithalenedicarboxylate anion; 4,4'-biphenyldicarboxylate anion; 4,5,9,10-tetrahydropyrene-2,7-dicarboxylate anion; pyrene-2,7-dicarboxylate anion; 4,4"-terphenyldicarboxylate anion; or any derivative thereof.

4. A hydrogen storage tank comprising a container accommodating a hydrogen adsorbent therein, wherein said hydrogen adsorbent adsorbs hydrogen gas and accommodates said hydrogen gas in a space other than a space occupied by said hydrogen adsorbent in said container, wherein
   said hydrogen adsorbent is any one of $[M_2(4,4'$-bipyridine$)_3$ $(NO_3)_4]$ provided that M represents any one of Co, Ni, and Zn; $[M_2(1,4$-benzenedicarboxylate anion$)_2]$ provided that M represents any one of Cu and Zn; and $[Fe_2(trans$-$4,4'$-azopyridine$)_4(NCS)_4]$; and
   said hydrogen adsorbent is a substance which satisfies the following expression (1) and which has an amount of endothermic heat of not more than 16 kJ per mol of hydrogen molecules when said adsorbed hydrogen gas is released:

$$Y > 2 \times 10^{-4} \times P/(\rho^* \times z \times R \times T) \tag{1}$$

wherein Y represents a ratio of adsorption in units of % by weight of said hydrogen gas with respect to a weight of said hydrogen adsorbent, P represents a hydrogen gas pressure in units of MPa obtained when charging of said hydrogen gas is completed, $\rho^*$ represents a true density in units of $g/cm^3$ of said hydrogen adsorbent, z represents a compressibility factor of said hydrogen gas, R represents a gas constant of 8.314 J/mol·K, and T represents an absolute temperature in units of K.

5. A hydrogen storage tank comprising a container accommodating a hydrogen adsorbent therein, wherein said hydrogen adsorbent adsorbs hydrogen gas and accommodates said hydrogen gas in a space other than a space occupied by said hydrogen adsorbent in said container, wherein
   said hydrogen adsorbent is $M_4O$(aromatic dicarboxylate anion$)_3$ or $M_4O$(aromatic dicarboxylate anion derivative$)_3$, wherein M represents Zn or a transition metal, and said hydrogen adsorbent is a substance which satisfies the following expression (1) and which has an amount of endothermic heat of not more than 16 kJ per mol of hydrogen molecules when said adsorbed hydrogen gas is released:

$$Y > 2 \times 10^{-4} \times P/(\rho^* \times z \times R \times T) \tag{1}$$

wherein Y represents a ratio of adsorption in units of % by weight of said hydrogen gas with respect to a weight of said hydrogen adsorbent, P represents a hydrogen gas pressure in units of MPa obtained when charging of said hydrogen gas is completed, $\rho^*$ represents a true density in units of g/cm$^3$ of said hydrogen adsorbent, z represents a compressibility factor of said hydrogen gas, R represents a gas constant of 8.314 J/mol·K, and T represents an absolute temperature in units of K.

6. The hydrogen storage tank according to claim 5, wherein said aromatic dicarboxylate anion or said derivative thereof is 1,4-benzenedicarboxylate anion; 2-bromo-1,4-benzenedicarboxylate anion; 2-amino-1,4-benzenedicarboxylate anion; 2,5-propyl-1,4-benzenedicarboxylate anion; 2,5-pentyl-1,4-benzenedicarboxylate anion; cyclobutene-1,4-benzenedicarboxylate anion; 1,4-naphthalenedicarboxylate anionp; 2,6-naphthalenedicarboxylate anion; 4,4'-biphenyldicarboxylate anion; 4,5,9,10-tetrahydropyrene-2,7-dicarboxylate anion; pyrene-2,7-dicarboxylate anion; 4,4"-terphenyldicarboxylate anion; or any derivative thereof.

* * * * *